United States Patent [19]

Cataldo

[11] Patent Number: 4,465,469
[45] Date of Patent: Aug. 14, 1984

[54] DRIVE BLOCK FOR A CONTINUOUS METAL BAND DRIVE BELT

[75] Inventor: Roy S. Cataldo, Birmingham, Mich.

[73] Assignee: General Motors Corporation, Detroit, Mich.

[21] Appl. No.: 380,682

[22] Filed: May 21, 1982

[51] Int. Cl.³ .......................... F16G 5/00; F16G 5/16
[52] U.S. Cl. .................................. 474/201; 474/242; 474/272; 474/265
[58] Field of Search ............... 474/201, 240, 242, 244, 474/245, 272

[56] References Cited

U.S. PATENT DOCUMENTS

| | | | |
|---|---|---|---|
| 3,720,113 | 3/1973 | Van Doorne et al. | 474/242 |
| 4,080,841 | 3/1978 | Vollers | 474/201 |
| 4,299,586 | 11/1981 | Van der Hardt Aberson | 474/201 |
| 4,303,403 | 12/1981 | Lamers | 474/201 |
| 4,338,081 | 7/1982 | Hattori et al. | 474/201 |
| 4,342,561 | 8/1982 | Braybrook | 474/242 |

FOREIGN PATENT DOCUMENTS

| | | | |
|---|---|---|---|
| 55-163349 | 12/1980 | Japan | 474/201 |
| 256918 | 9/1948 | Switzerland | 474/201 |
| 655173 | 7/1951 | United Kingdom | 474/201 |

Primary Examiner—Leslie A. Braun
Assistant Examiner—Dwight G. Diehl
Attorney, Agent, or Firm—Donald F. Scherer

[57] ABSTRACT

The drive belt has one or more continuous metal bands which slidably support a plurality of drive blocks. Each drive block has a transverse arcuate surface having a radius dimension substantially equal to or 1% less than a transverse radius formed in the metal band. Each drive block also has an opening which facilitates band assembly. The opening is outwardly diverging and terminates inwardly in a slot at the transverse arcuate surface. The opening permits flexing of the metal bands during assembly of the metal bands and the drive blocks without exceeding the yield stress of the metal bands. The inner slot provides a retaining mechanism for the metal bands after assembly.

3 Claims, 3 Drawing Figures

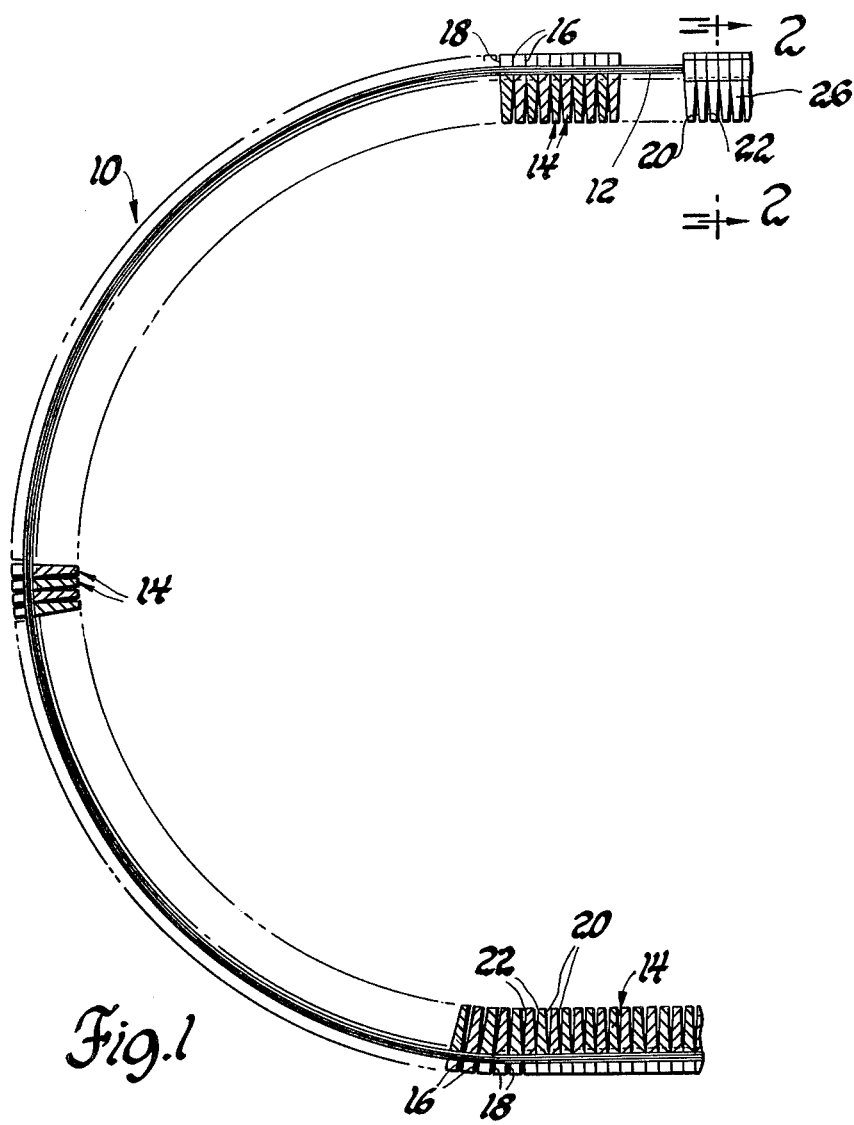
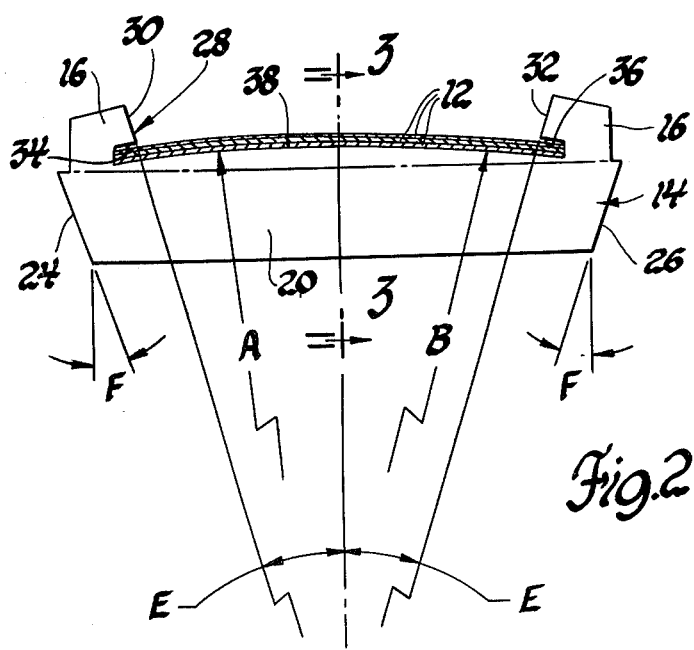
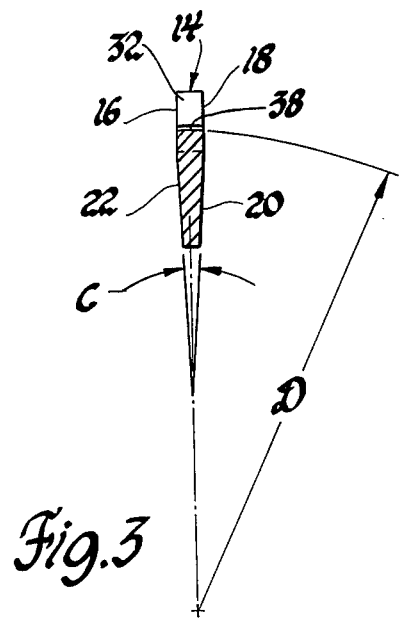

DRIVE BLOCK FOR A CONTINUOUS METAL BAND DRIVE BELT

This invention relates to drive belts and more particularly to drive belts having a plurality of drive blocks disposed on continuous metal bands.

It is an object of this invention to provide an improved drive belt having a plurality of individual drive blocks maintained in a continuous loop by a metal band without the use of assembly pins or metal displacement to accommodate assembly.

It is another object of this invention to provide an improved drive belt having a plurality of drive blocks disposed on a continuous metal band wherein the drive blocks and the metal band have adjacently disposed curved surfaces providing a sliding abutment therebetween and wherein the drive blocks have a band assembly opening which is outwardly diverging and dimensioned to permit flexing of the band during assembly of the blocks on the band without exceeding the yield strength of the band material.

These and other objects and advantages of the present invention will be more apparent from the following description and drawings in which:

FIG. 1 is a cross-sectional elevational view showing a portion of the drive belt;

FIG. 2 is a view taken along line 2—2 of FIG. 1; and

FIG. 3 is a view taken along line 3—3 of FIG. 2.

In FIG. 1, it can be seen that a drive belt 10 is comprised of a plurality of metal bands 12 on which are arranged a plurality of drive blocks 14. In general, such belt assemblies are well-known. The drive blocks 14, as best seen in FIG. 3, have substantially flat parallel surfaces 16 and 18 transverse to the longitudinal axis of bands 12 and tapered surfaces 20 and 22 disposed inwardly from the band and block contact area. These tapered surfaces 20 and 22 permit the band to accommodate operation with various pulley diameters and also permit use of the belt 10 in what is commonly called a continuous variable belt drive. The tapered surfaces 22 and 20 have angled end surfaces 24 and 26 which are adapted to frictionally engage pulleys, not shown, when the belt is operating a pulley drive system.

The portion of each drive block 14 encompassed by the parallel surfaces 16 and 18 has a central opening generally designated 28 and defined by end surfaces 30 and 32 which are diverging relative to each other as they extend toward the outer extent of opening 28. The inner end of surface 30 is defined by an upper edge of a slot 34, while the inner end 32 is defined by an upper edge of a slot 36. The lower surface of both slots 34 and 36 is defined by a radius surface 38 having a radius dimension A against which the metal bands 12 are disposed.

The metal bands 12 have a radius dimension B when viewed in cross section as seen in FIG. 2. The radius dimensions A and B can be substantially equal or radius A can be 1% less than radius B. It is generally preferred in most mechanisms that radius A will be 1% less than radius B. The surfaces 30 and 32 are diverging from the central axis of drive block 14 at an angle E as seen in FIG. 2 and the end surfaces 24 and 26 are disposed at an angle F relative to the central axis of the drive blocks 14.

The surfaces 30 and 32 are designed to permit the flexing of metal bands 12 in a manner which reduces the radius dimension B at assembly without having the yield stress of metal band 12 exceeded. Thus, it is preferred that the larger transverse dimension provided between surfaces 30 and 32 will be equal to 79% of the metal band width while the minimum span of the distance between the surfaces 30 and 32 is equal to 76%. The slots 34 and 36 provide retention of the metal band 12 after assembly and have a minimum extent equal to 20% of the width of the metal band.

As seen in FIG. 3, the drive blocks 14 have a tapered angle equal to C which is equally divided between the surfaces 20 and 22 by tapering both sides of the drive block. The tilting of individual blocks during relative movement caused by engagement with the drive pulley is reduced, due to symmetrical tapering, thereby reducing internal friction in the system. The surface 38 of drive blocks 14, as seen in FIG. 3, also has a radius dimension D transversely disposed to the radius dimension A. Thus, the surface 38 is a compound curved surface.

In one embodiment of the drive block 14, the dimension A is equal to 80 inches, the dimension B is equal to 81.5 inches, the dimension C is equal to 1.5°, the dimension D is equal to 1 inch, the dimension E is equal to 17.5° and the dimension F is equal to 19°. In this embodiment, the maximum span between surfaces 30 and 32 is equal to 0.82 inches while the normal dimension from end to end of slots 34 and 36 will be 1.1 inches. The drive blocks defined by the invention permit the assembly of the metal band to the drive blocks without the use of assembly pins. It is also possible to use a single set of metal bands as opposed to two sets of bands installed in slots extending inwardly from either side of the drive blocks. Other assemblies have been proposed in which the drive bands are inserted in a single rectangular opening on each block. After the band is in place, the edges of the opening are bent inwardly to define the retaining mechanism. Thus, it should be apparent to one skilled in the art upon review of this teaching, that a simple and inexpensive belt assembly can be provided by utilizing the teachings found in the present invention.

The embodiments of the invention in which an exclusive property or privilege is claimed are defined as follows:

1. A metal band and block for a continuous belt drive mechanism comprising: a continuous metal band having a constant radius curved transverse cross section viewed in an axial plane; and a plurality of wedge blocks disposed in abutting relation on said metal band, each wedge block having a transverse arcuate belt support surface having a radius dimension substantially equal to the constant radius curve of the metal band, an arc length dimension substantially equal to the axial width of the metal band, and each wedge block also having a band entering opening having an outer aperture dimensioned to have a minimum span equal to 79% of the metal band width, an inner aperture dimensioned to have a minimum span width of 76% of the metal band width and side walls converging from the outer to the inner aperture whereby the band may be flexed in the radial direction to enter the band opening during assembly without yield stress of the band being exceeded such that after assembly the inner surface of the continuous metal band rests on said arc length dimension, and retaining slots formed integrally in said wedge block and being disposed between said inner aperture and said belt support surface arc length, said slots having laterally extending surface spaced from said belt support surface and having a combined minimum extent equal to 20% of the width of said metal band.

2. A metal band and block for a continuous belt drive mechanism comprising; a continuous metal band having a constant radius curved transverse cross section viewed in an axial plane; and a plurality of wedge blocks disposed in abutting relation on said metal band, each wedge block having a transverse arcuate belt support surface having a radius dimension 1% less than the constant radius curve of the metal band, an arc length dimension substantially equal to the axial width of the metal band, and each wedge block also having a band entering opening having an outer aperture dimensioned to have a minimum span equal to 79% of the metal band width, an inner aperture dimensioned to have a minimum span width of 76% of said metal band width and side walls converging from the outer to the inner aperture whereby the band may be flexed in the radial direction to enter the band opening during assembly without yield stress of the band being exceeded such that after assembly the inner surface of the continuous metal band rests on said arc length dimension, and retaining slots formed integrally in said wedge block and being disposed between said inner aperture and said belt support surface arc length, said slots having a laterally extending surface spaced from said belt support surface and having a combined extent equal to 20% of the width of said metal band.

3. A metal band and block for a continuous belt drive mechanism comprising: a continuous metal band havig a constant radius curved transverse cross section viewed in an axial plane; and a plurality of wedge blocks disposed in abutting relation on said metal band, each wedge block having a transverse arcuate belt support surface having a radius dimension 1% less than the constant radius curve of the metal band, an arc length dimension substantially equal to the axial width of the metal band, and each wedge block also having a band entering opening having an outer aperture dimensioned to have a span greater than 78% of the metal band width, an inner aperture dimensioned to have a minimum span width of 76% of said metal band width and side walls converging from the outer to the inner aperture whereby the band may be flexed in the radial direction to enter the band opening during assembly without yield stress of the band being exceeded such that after assembly the inner surface of the continuous metal band rests on said arc length dimension, and retaining slots formed integrally in said wedge block and being disposed between said inner aperture and said belt support surface arc length, said slots having a laterally extending surface spaced from said belt support surface and having a combined minimum extent equal to 20% of the width of said metal band.

* * * * *